United States Patent [19]
Nogales et al.

[11] Patent Number: 5,809,328
[45] Date of Patent: Sep. 15, 1998

[54] APPARATUS FOR FIBRE CHANNEL TRANSMISSION HAVING INTERFACE LOGIC, BUFFER MEMORY, MULTIPLEXOR/CONTROL DEVICE, FIBRE CHANNEL CONTROLLER, GIGABIT LINK MODULE, MICROPROCESSOR, AND BUS CONTROL DEVICE

[75] Inventors: Charles Edward Nogales, San Juan Capistrano; William Glenn Sooy, Laguna Niguel, both of Calif.

[73] Assignee: Unisys Corp., Blue Bell, Pa.

[21] Appl. No.: 576,113

[22] Filed: Dec. 21, 1995

[51] Int. Cl.$^6$ .................................................. G06F 13/00
[52] U.S. Cl. ........................................ 395/825; 395/882
[58] Field of Search ................................ 364/238.3, 239; 395/250, 308, 825, 882

[56] References Cited

U.S. PATENT DOCUMENTS

| | | | |
|---|---|---|---|
| 4,939,644 | 7/1990 | Harrington et al. | 395/825 |
| 5,455,954 | 10/1995 | Packer | 395/894 |
| 5,561,806 | 10/1996 | Fitchett et al. | 395/800 |
| 5,598,541 | 1/1997 | Malladi | 395/286 |
| 5,602,667 | 2/1997 | Patel | 359/161 |

OTHER PUBLICATIONS

Emulex Corporation, LightPulse PCI Host Adapter data sheet, Mar. 1995.
PCI Bus: full–speed fibre channel PCI Bus announced by Emulex Network Systems, Edge: Work–Group Computing report, v6, n279, Mar. 1995.

*Primary Examiner*—Thomas C. Lee
*Assistant Examiner*—Anderson I. Chen
*Attorney, Agent, or Firm*—J. Ronald Richebourg; Mark T. Starr; Steven R. Petersen

[57] ABSTRACT

The present invention is an apparatus for adapting transmissions between an industry standard data bus of a host computer having a host memory and a fiber channel coupled between said host computer and a peripheral storage subsystem having at least one disk drive, which apparatus comprises an interface logic coupled between the industry standard bus and a local bus of the apparatus; a buffer memory coupled to the local bus; a multiplexor/control device coupled to the local bus and being disposed for transmitting therethrough address and data; a fiber channel controller disposed for formatting header and data structures that meet fiber channel protocol, which controller is coupled to the multiplexor/control; a gigabit link module disposed for converting the header and data structures from a parallel format to a serial format and being coupled between the fiber channel controller and the fiber channel; a microprocessor disposed for providing service requests from the host to read and write data from the host memory to and from the peripheral storage subsystem via the buffer memory, the microprocessor is coupled to a processor bus; and, a bus control device coupled between the processor bus and the local bus for providing service requests of the interface logic, the fiber channel controller and the microprocessor, and for arbitrating control of the local bus.

11 Claims, 4 Drawing Sheets

5,809,328

APPARATUS FOR FIBRE CHANNEL TRANSMISSION HAVING INTERFACE LOGIC, BUFFER MEMORY, MULTIPLEXOR/CONTROL DEVICE, FIBRE CHANNEL CONTROLLER, GIGABIT LINK MODULE, MICROPROCESSOR, AND BUS CONTROL DEVICE

FIELD OF THE INVENTION

The present invention generally relates to an electronic apparatus and method of operation that provides an interface connection from an industry standard Peripheral Component Interconnect ("PCI") bus to a very high speed serial channel defined herein as Fibre Channel.

BACKGROUND OF THE INVENTION

Greater demands are being made in architecture, performance and implementation across the entire spectrum of computer systems, from supercomputers to PC's. Such demands are dictated by emerging data-intensive applications that require extremely high data rates. Demands for greater interconnection flexability are also being made. Today, high-performance workstations and intelligent mass storage systems are providing an alternative to the supercomputers used for such data-intensive applications in the past.

It is not uncommon today to cluster a number of workstations together, each operating independently, and linking them to mass storage and display subsystems. Moreover, desktop workstations need to access supercomputers from a distance, such as from a nearby building or across the street. Such developments are bringing about fundamental changes in the way that high-performance computers and peripherals need to be connected. Computers are becoming faster and capable of handling larger amounts of data. However, the network interconnnects between computers and I/O devices are not keeping pace and are not able to run at the high speeds necessary.

Many systems applications face a communications and I/O bottleneck, which is the result of the limited transmission speed of the prior art interconnect technologies. Fibre channel interconnects can help alleviate this problem by providing cost effective, high-speed interconnects between clustered workstations and massive, intelligent storage systems.

For example, a prior art fast SCSI parallel link from a disk drive to a workstation can transmit data at 160 megabits/sec, but it is restricted in length and requires the disk drive to be located no more than a few feet from the computer. In contrast, a quarter-speed Fibre Channel link transmits information at 200 megabits/sec over a single, compact optical cable pair up to 10 kilometers in length. It is noted that full speed Fibre Channel links transmit information at 800 Megabits/second.

Note that the term "fibre" is used herein as a generic term, which can indicate either an optical or a metallic cable. Fibre channel is the general name of an integrated set of standards being developed by the American National Standards Institute (ANSI) which defines new protocols for flexible information transfer.

SUMMARY OF THE INVENTION

It is therefore an object of the present invention to provide an apparatus that has high-bandwidth utilization with distance insensitivity.

It is another object of the apparatus of the present invention to support multiple cost/performance levels, from small systems to supercomputers.

Yet another object of the apparatus of the present invention is to provide the ability to carry multiple existing interface command sets, while preserving current driver software.

The present invention is an apparatus for adapting transmissions between an industry standard data bus of a host computer having a host memory and a fibre channel coupled between said host computer and a peripheral storage subsystem having at least one disk drive, which apparatus comprises an interface logic coupled between the industry standard bus and a local bus of the apparatus; a buffer memory coupled to the local bus; a multiplexor/control device coupled to the local bus and being disposed for transmitting therethrough address and data; a fibre channel controller disposed for formatting header and data structures that meet fibre channel protocol, which controller is coupled to the multiplexor/control; a gigabit link module disposed for converting the header and data structures from a parallel format to a serial format and being coupled between the fibre channel controller and the fibre channel; a microprocessor disposed for providing service requests from the host to read and write data from the host memory to and from the peripheral storage subsystem via the buffer memory, the microprocessor is coupled to a processor bus; and, a bus control device coupled between the processor bus and the local bus for providing service requests of the interface logic, the fibre channel controller and the microprocessor, and for arbitrating control of the local bus.

The foregoing and other objects, features and advantages of this invention will become apparent from the following more particular description of a preferred embodiment of the invention, as illustrated in the accompanying drawings in which like reference numerals refer to the same components throughout the different views. The drawings are not necessarily to scale, emphasis instead being placed upon illustrating the principles of the invention.

DESCRIPTION OF A PREFERRED EMBODIMENT

Figure 1:
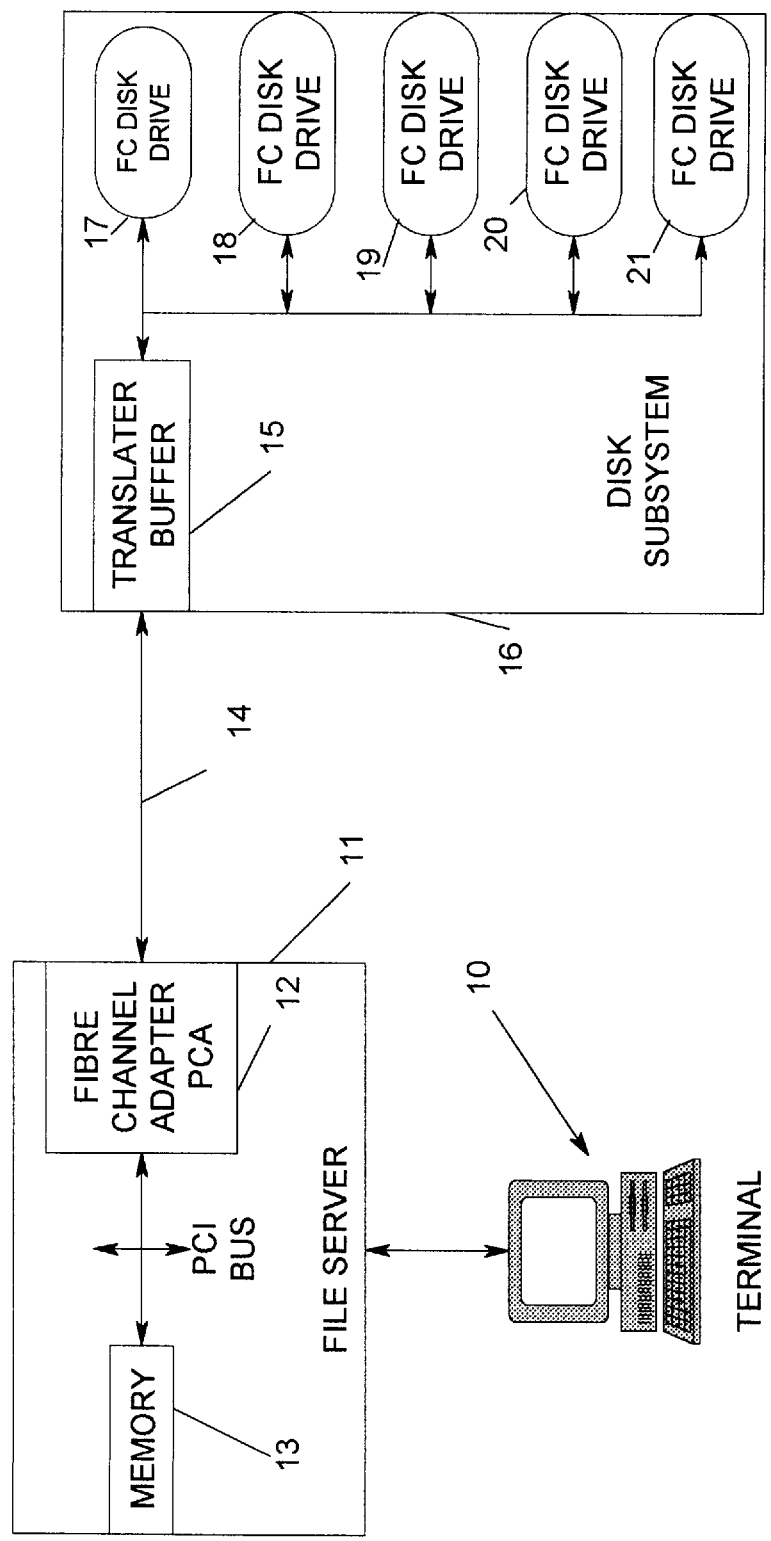
FIG. 1 is an overall block diagram of a system that employs the apparatus of the present invention.

Referring now to FIG. 1, an overall block diagram of a system employing the present invention is shown wherein a terminal 10 is coupled to a file server 11. The file server 11 includes a fibre channel adapter (FCA) 12, which includes the apparatus of the present invention, and a memory 13. The FCA 12 is coupled to a fibre channel 14 having another end thereof coupled to a translater buffer 15 within a disk subsystem 16. The disk subsystem 16 includes fibre channel compatable disk drives 17 through 21.

Figure 2:
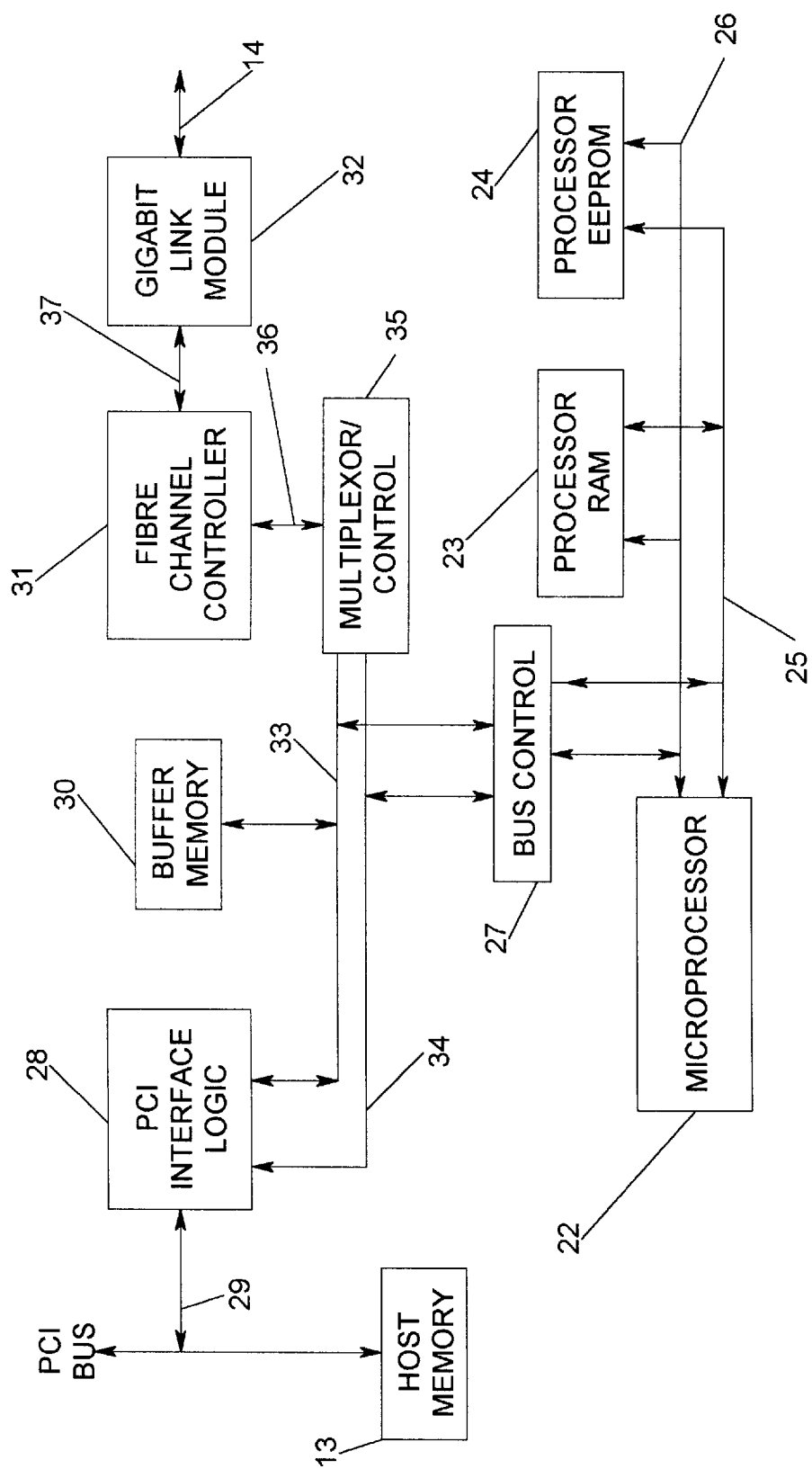
FIG. 2 is a block diagram of the apparatus of the present invention.

With reference to FIG. 2, the apparatus of this invention is illustrated in block diagram form and is divided into two sections: a processor section and a local bus section. The processor section includes a microprocessor 22 (also referred to herein as processor 22), a RAM 23 used as an instruction memory, an EEPROM 24 used as a flash memory, an address bus 25 and a data bus 26 (which is sometimes collectively referred to herein as processor bus 25/26). In one embodiment that was built, an Intel 80960 was used as the microprocessor 22, which is available from Intel Corporation, Santa Clara, Calif. Reference is made to a text book entitled "Microcontrollers" by Kenneth Hintz and Daniel Tabak for techniques in programming microprocessors, such as the Intel 80960.

The local bus section includes the local bus controller 27 (which is also coupled to the processor bus 25/26), a PCI bus interface logic 28 (which is also coupled to a PCI bus 29), a buffer memory 30 and a fibre channel (or "FC") controller 31. A gigabit link module 32 ("GLM") is coupled between the fibre channel 13 and the FC controller 31 by means of a parallel data bus 37. A local bus, comprising a data bus 33 and an address bus 34 (hereinafter sometimes collectively referred to as local bus 33/34), connects the bus control 27 with the PCI interface logic 28 and the buffer memory 30. The local bus 33/34 is the path for moving data between the buffer memory 30 and the devices on the fibre channel 13 via a multiplexor/control 35, the FC controller 31 and the GLM 32. The processor 22 has access to the local bus 33/34 for communication with the resources connected thereto.

Selection of the processor bus 25/26 for use by the processor 22 to communicate with its resources is by means of an address region decode. The processor 22 divides its four gigabyte address space into sixteen 256 Mbyte regions using the four most significant address bits. Additionally, the fifth most significant address bit is used to select the upper or lower half of a region within the buffer memory 30. The following table illustrates the memory map for the microprocessor used in one embodiment.

MEMORY MAP
(ADDRESS RANGE FOR REGIONS)

| | |
|---|---|
| RESERVED i960 INTERNAL RAM | 00000000 <br> 000003FF |
| PCI REGISTERS | 08000000 <br> 08000133 |
| RESERVED EXPANSION ROM | 10000000 <br> 1FFFFFFF |
| PCI HOST MEMORY | 20000000 <br> 2FFFFFFF |
| DATA BUFFER (512 KB) | 90000000 (B0000000) <br> 9007FFFF (B007FFFF) |
| TACHYON REGISTERS (WORD ONLY) | A0000000 <br> A00001EC |
| CONTROL REGISTERS (WORD ONLY) | D0000000 <br> D000003C |
| CONTROL STORE (512 KB) | E0000000 <br> E007FFFF |
| FLASH MEMORY (256 KB) | FFFC0000 <br> FFFFFFFF |

The processor 22 is isolated from the local bus 33/34 to improve performance. Since the microprocessor 22 is the only bus master on the processor bus 25/26, instruction fetches and "data" transfers to the control store 24 are free of contention from local bus 33/34 activity. When access to one of the resources on the local bus 33/34 is required, the processor 22 becomes one of three bus masters arbitrating for use of the local bus 33/34. The bus control 27 (which is a PLD) controls accesses to the local bus 33/34 and attempts to provide "fair" access to each of the three bus masters by using a least-recently-used arbitration scheme. The bus control 27 does not provide control of bus latency. Once an agent becomes the bus master, its length of ownership and therefore the latency for other agents, is determined by the type of transfer and programmable parameters (under microcode control), as well as access to the PCI bus 29. Resources on the processor bus 25/26 are not accessible by a PCI bus master or local bus master. When granted access to the local bus 33/34, the processor address bus 25 is driven onto the local address bus 34 by means of tri-state drivers, and the processor data bus 26 is extended to the local data bus 33 by means of tri-state transceivers. In one embodiment that was built, the bus control 27 includes a programmable logic device (PLD), such as a Mach 445 manufactured by Advanced Micro Devices, Inc., of Sunnyvale, Calif. The PLD within the bus control 27 is programmed in accordance with the program set forth in Appendix A hereof.

By means of the local bus 33/34, the processor 22 has access to the buffer memory 30, registers within the PCI interface logic 28, and registers within the FC Controller 31 and other agents coupled to the PCI bus 29. Each of these resources is defined as a separate processor region and the characteristics of those address regions are detailed in memory configuration registers of the processor (which are loaded by the microcode stored therein).

The multiplexor/control 35 contains bi-directional registers and buffers and a programmable logic device ("PLD"), which has two major functions. First, the FC controller 31 has a multiplexed (i.e., shared address and data) I/O bus 36. The multiplexor/control 35 controls the separation and merging of the bus 36 with the local bus 33/34, depending upon the direction of data flow and upon which bus master (i.e., processor 22, PCI interface logic 28 or FC controller 31) is in control. The PLD receives information from the bus master and generates signals that control the bi-directional registers and buffers which carry out the separation/merging of the bus 36 with the local bus 33,34. Also, the PLD converts control signals from the bus master to signals understood by the target device (e.g., the buffer memory 30), or one of the other bus masters (e.g., processor 22 or PCI interface logic 28). The PLD within the multiplexor/control 35 in one embodiment that was built is as a Mach 220, which is available from Advanced Micro Devices, Inc. of Sunnyvale, Calif. This PLD is programmed in accordance with the program set forth in Appendix B hereof.

When the FC controller 31 is the bus master, it can provide a single address followed by up to eight words of data. The intent of this operation is to read/write data at the original address, and the following seven sequential addresses. Other elements in the design require an address for each word of data. The PLD contains a counter that stores and increments the original address supplied by the FC controller 31.

By using the local bus 33/34, each of the three bus masters (the processor 22, the PCI interface logic 28, and the FC controller 31) has access to several resources. The processor can extend its data bus 25 to the local bus 33/34 by means of the bus control logic 27 to gain access to registers within the PCI interface logic 28; PCI memory 13, registers within the FC controller 31, as well as the buffer memory 30. A PCI bus master can access registers within the PCI interface logic 28; buffer memory 30, and the internal registers within the FC controller 31. Additionally, the FC controller 31 can access the internal registers of the PCI Interface Logic 28, PCI memory 13 or buffer memory 30.

A PCI bus master can communicate with the processor 22 via mailbox and doorbell registers which are part of the PCI Interface Logic 28, or by transfeering information to a designated area in the buffer memory 30.

The FC controller 31 manages the protocol for sending and receiving information on the fibre channel 14. To achieve this, the processor 22 and the FC controller 31 share data structures and data buffers that are maintained in the buffer memory 30. The FC controller 31 provides a connection between the GLM 32 and local bus 33/34 via the address/data bus 36 and the multiplexor/control 35.

The processor 22 can access the buffer memory 30 by using either addresses in processor region 9 or 11; wherein the memory configuration registers define region 9 as little endian and region 11 as big endian. The term "endian" refers to the sequence in which a multi-byte word is transferred. For example, "little endian" means that the least significant byte is transferred first with the most significant byte being transferred last. The term "big endian" refers to the transfer of the most significant byte first, etc. This allows the processor to move information between two locations in the buffer memory (potentially the same location) and change the byte ordering at the same time. This ability to change endianess, by reading from one region and writing to another is useful when dealing with commands or status information. It is also useful when reading from or writing to disk drives that may be formatted differently.

A specific example of endianness occurs at the PCI interface logic 28. The PCI bus is in little endian format and the FC controller 31 assumes/supplies data in big endian format. In order to provide compatible data between the two systems, a byte swap is performed at the PCI interface 28 to the local bus 33/34. Thus, the PCI interface logic 28 provides the PCI bus 29 to local bus 33/34 interface. The logic 28 can function as either a bus master or target on both the PCI 29 and the local bus 33/34. In one embodiment a PCI 9060, which is available from PLX Technology, Inc. of Mountain View, Calif., was used for the logic 28. The PCI 9060 has four sets of internal registers and operates in three modes: The register access mode, the DMA mode and the Pass-Through mode.

The buffer memory 30 is constructed as a 512 KB by 9 block of SRAM and is accessible by the local bus 33/34. It serves several purposes: first it contains queues which are common to the microprocessor 22 and the FC controller 31; second, it can be used for temporary data storage and it can be used for communication between the PCI interface logic 28 and the microprocessor 22.

In one embodiment, an HP Tachyon chip, which is available from Hewlett Packard Company of Palo Alto, Calif., was used for the FC Controller 31. This chip performs as an interface between the GLM 32 and the multiplexor control 35. For this function it uses internal configuration registers, and operates from queues maintained in the buffer memory 30. On the GLM interface side, 8 bits of raw data are encoded into 10 bit code words for transmission purposes. This encoding schem is described by Widner et al in "A DC Balanced Partitioned Block, 8B/10B Transmission Code" in the IBM Journal of Research and Development, Volumn 27, 1983, pp 446–451. The purpose for this encoding is to maximize the number of binary data transmissions. The high transmission data rate improves the ability of the receiver to stay locked in synchronism with the transmitter. A decoding operation is performed on receipt of 10 bit code words to 8 bit data bytes.

The FC Controller 31 also implements a protocol for organizing data frames of the code words for transmitting and receiving, which protocol is disclosed in U.S. Pat. No. 5,260,933, entitled ACKNOWLEDGEMENT PROTOCOL FOR SERIAL DATA NETWORK WITH OUT-OF-ORDER DELIVERY, by G. L. Rouse. The Fibre Channel Specifications used in building one embodiment of the present invention include the following ANSI Standards:

| Fibre Channel FC-PH Physical & Signalling Interface | X3T11/Project 755D | Rev. 4.3 |
|---|---|---|
| Fibre Channel FC-AL Arbitrated Loop | X3T11/Projcet 960D | Rev. 4.5 |
| Fibre Channel FCP Protocol for SCSI | X3T10/ X3.2 69- 199X | Rev. 012 |

Figure 3A:
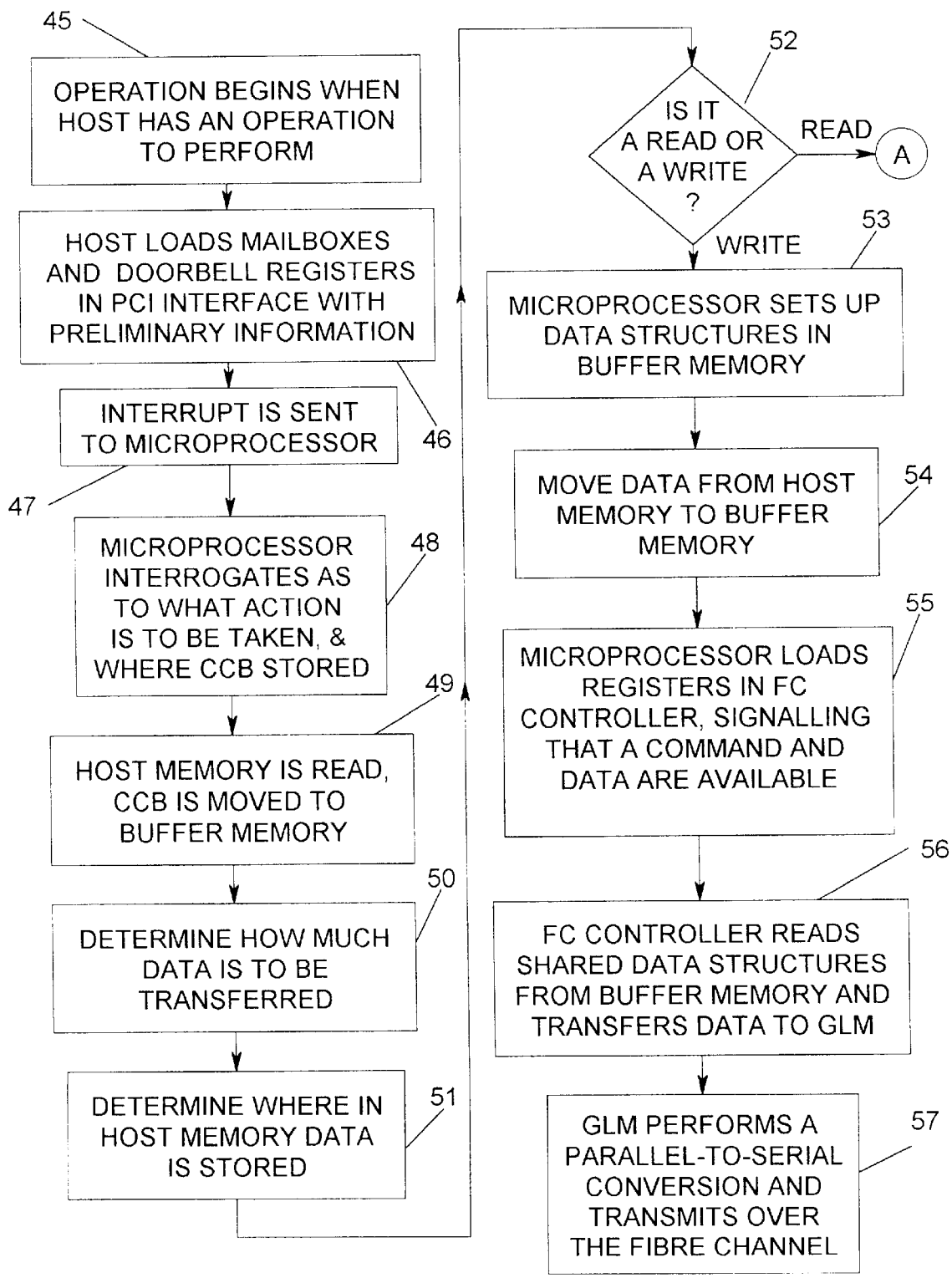
FIGS. 3A and 3B combined form a flow chart that illustrates the steps of the method of operation.
Figure 3B:
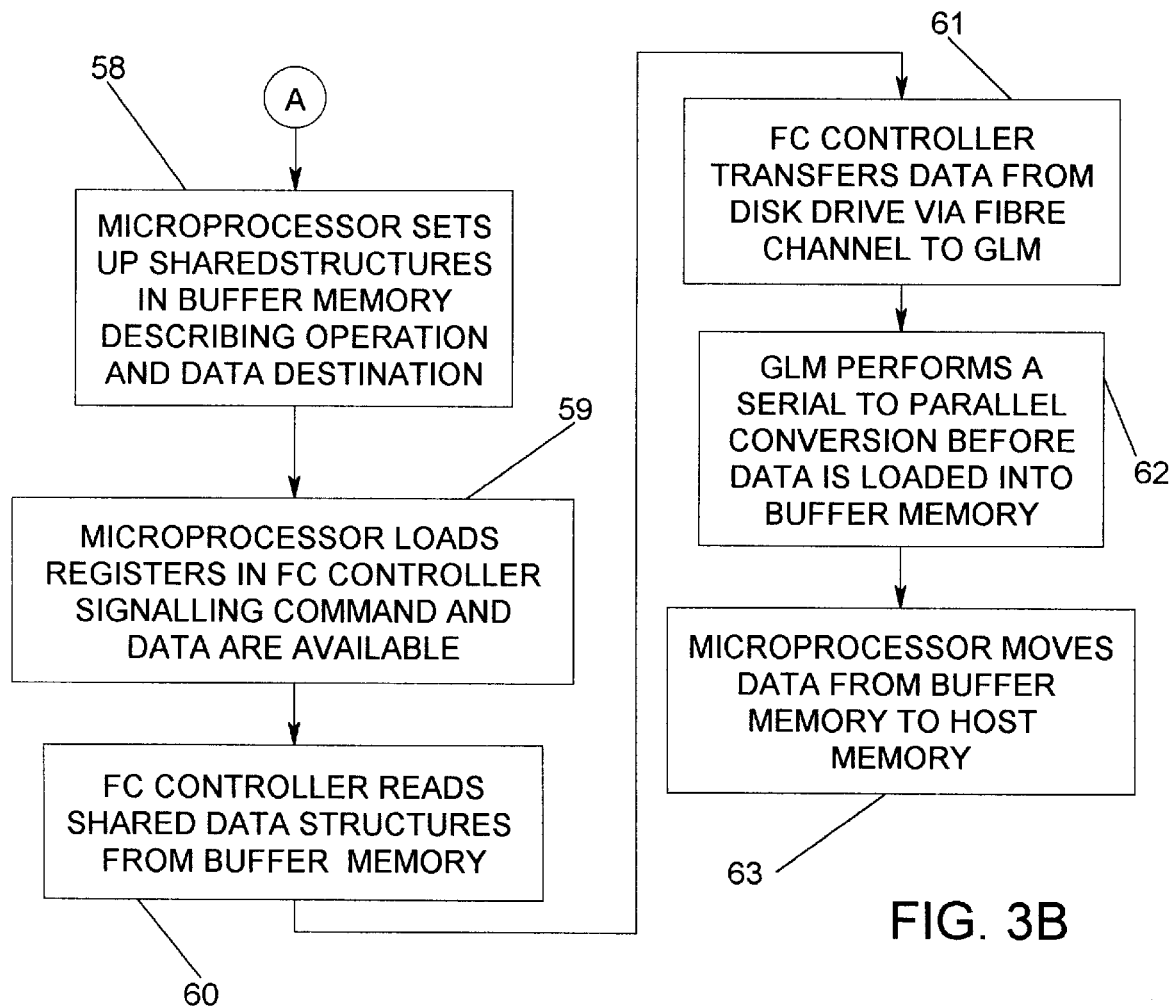

In summary, the operation of the Fibre Channel Apparatus of the present invention is illustrated in FIGS. 3A and 3B. The sequence begins when the host (i.e., the file server 11) has an operation to perform (as depicted by a block 45). The driver (host code) writes preliminary information into the mailboxes and doorbell registers, which are part of the PCI Controller 28 (block 46). The act of writing to the doorbell register causes an interrupt to the microprocessor 22 to be generated (block 47). Next, the microprocessor 22 interrogates the information in the mailboxes to determine what action is required, to what device and where in the host memory 13 a command control block (CCB) is stored (block 48). Using a direct memory access (DMA) controller, which is part of the PCI Interface Logic 28, the processor 22 moves the CCB from the host memory 13 to the buffer memory 30 (block 49). From codes within the CCB, the processor 22 determines what operation is to be performed (i.e, is it a write or a read operation), how much data is to be transferred (block 50), and where in the host memory 13 data is located (for a write operation) or to be stored (read operation) (block 51).

At this juncture, it is determined if the command is a read or a write operation (decision diamond 52). For a write data operation, the processor 22 sets up shared data structures in the buffer memory 30 (block 53), which describes the operation and the data location for the FC Controller 31. Using the DMA controller within the PCI Interface Logic 28, the processor 22 moves the write data from the host memory 13 to the buffer memory 30 (block 54), and then informs the FC Controller 31 that a command and data are available by writing to registers within the FC Controller 31 (block 55). In preparation for the data transfer, the FC Controller 31 reads the shared data structures from the buffer memory 30, and then transfers data from the buffer to the GLM 32 (block 56), which performs a parallel to serial conversion (block 57). The data is subsequently transmitted over the Fibre Channel 14 to a disk drive for storage.

For a read data operation, a branch is taken from the diamond 52 to the flow chart illustrated in FIG. 3B as denoted by a connector "A". The processor 22 sets up shared structures in the buffer memory 30 that describe the operation and data destination for the FC controller 31 (block 58); and, then informs the FC Controller that a command is available by writing to registers therein (block 59). In preparation for the data transfer, the FC Controller 31 reads the shared data structures from the buffer memory 30 (block 60), and then transfers data from a disk drive over the fibre channel 14 via the GLM 32 (block 61) (which performs a serial to parallel conversion-block 62) to the buffer memory 30. Using the DMA controller within the PCI Interface Logic 28, the processor 22 directs moving of the read data from the buffer memory 30 to the host memory 13 (block 63).

Figure 4:
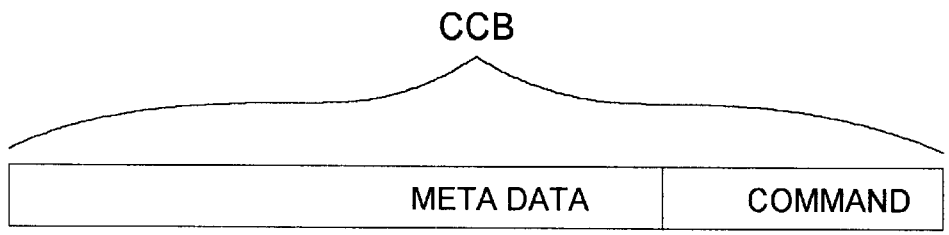
FIG. 4 is a diagram of a command control block (CCB).

FIG. 4 illustrates the organization of the command control block (CCB) into a command part and meta data (information about data) part, such as the location of the data in the host memory 13, for example, and the length of the data block.

While the invention has been particularly shown and described with references to preferred embodiments thereof, it will be understood by those skilled in the art that various changes in form and details may be made therin without departing from the spirit and scope of the invention as defined by the appended claims.

APPENDIX A

"MACROS

```
    FLASH    MACRO {( (REGION == ^hF) &  A27 )};
    CSTORE   MACRO {( (REGION == ^hE) & !A27 )};
    CREG     MACRO {( (REGION == ^hD) & !A27 )};

RES_C    MACRO {( (REGION == ^hC)        )}; "RESERVED
    BEDB2    MACRO {( (REGION == ^hB) &  A27 )}; "BIG ENDIAN DATA BUFFER 2 - NOT
    USED
    BEDB1    MACRO {( (REGION == ^hB) & !A27 )}; "BIG ENDIAN DATA BUFFER 1

    TAC2     MACRO {( (REGION == ^hA) &  A27 )}; "TACH. 2 - NOT USED
    TAC1     MACRO {( (REGION == ^hA) & !A27 )}; "TACH. 1

LEDB2    MACRO {( (REGION == ^h9) &  A27 )}; "LITTLE ENDIAN DATA BUFFER 2 - NOT
    USED
    LEDB1    MACRO {( (REGION == ^h9) & !A27 )}; "LITTLE ENDIAN DATA BUFFER 1

RES_83   MACRO {( (REGION <= ^h8)
                  & (REGION >= ^h3)        )}; "RESERVED

    PCIMEM   MACRO {( (REGION == ^h2)        )}; "PCI MEMORY
    EXPROM   MACRO {( (REGION == ^h1)        )}; "EXPANSION ROM
    PLXREG   MACRO {( (REGION == ^h0) &  A27 )}; "PLX REG

RES_0    MACRO {( (REGION == ^h0) & !A27 )}; "RESERVED
    DB2      MACRO {( BEDB2 # LEDB2 )}; "DATA BUFFER 2 - NOT USED
    DB1      MACRO {( BEDB1 # LEDB1 )}; "DATA BUFFER 1

    FC2      MACRO {( TAC2 # DB2 )}; "FIBRE CHANNEL 2 - NOT USED
    FC1      MACRO {( TAC1 # DB1 )}; "FIBRE CHANNEL 1

PCIACC   MACRO {( PLXREG # PCIMEM )};
```

```
    TACHOK   MACRO {( DB1 # PCIMEM      )};

PLXOK    MACRO {( DB1 # EXPROM # TAC1 )};
    TBREQ    MACRO {( (( TREQ == ^h1)      )
                    # (( TREQ == ^h2) & PAFULL_ ) )};

uPBREQ   MACRO {( !EXTREQ_ )};
    T_TARGET MACRO {( ((BCS.FB == uPWAIT ) & TAC1  )
                    # ((BCS.FB == PLXWAIT) & TAC1  ) )};

P_TARGET MACRO {( ((BCS.FB == uPMST  ) & PCIACC & !EXTBGNT_.FB )
                    # ((BCS.FB == uPWAIT ) & PCIACC          )
                    # ((BCS.FB == TACMST ) & PCIACC          )
                    # ((BCS.FB == TACTURN) & PCIACC          )
                    # ((BCS.FB == TACWAIT) & PCIACC          ) )};
```

EQUATIONS
"
"ENABLE OUTPUTS WHEN 'TS_' IS HI

MASTERS.OE   = TS_ ; "3
TARGETS.OE   = TS_ ; "2

BCS.OE       = TS_ ; "4
"SPARE.OE    = TS_ ;

[ BTERM_ , PRDYIN_, PBOFF , PLOCK_ , PPAR2D_, DPAR2P_ , TBG_ , LERR_ ].OE = TS_ ;
[ PRDYERR_, PECLK , PEINT_, RDY2uP_, TRETRY_, LCHD2uP_, TINT_, NMI_ ].OE = TS_ ;
[ TESTPT                                              ].OE = TS_ ;

"ENABLE OUTPUTS WHEN 'TS_' IS HI AND TACH. IS THE MASTER

TRDY_.OE  = ( TS_ & !TBM_ ); "DEFAULT FEEDBACK = .PIN

"ENABLE OUTPUTS WHEN 'TS_' IS HI AND TACH. IS THE MASTER OR THE BUS IS IDLE

BLAST_.OE = (( TS_ & !TBM_       )
           # ( TS_ & (BCS.FB == IDLE )));

"ENABLE OUTPUTS WHEN 'TS_' IS HI AND TACH. IS NOT THE BUS MASTER

AVCS_.OE  = ( TS_ &  TBM_ ); "AV.CS/ IS ACTIVE FOR 1 CLK

"ENABLE OUTPUTS WHEN 'TS_' IS HI AND PLX IS NOT THE BUS MASTER

ADS_.OE   = ( TS_ & !PBGNT ); "ADS/ IS ACTIVE FOR 1 CLK

```
    "CLOCK AND RESET
    BCS.CLK    = CLK   ;
    BCS.AR     = !RESET_ ;

[ PEINT_, DBSEL_, PCIRSEL_, RDY2uP_, PRDYIN_, LERR_, PRDYERR_, PBOFF ].CLK = CLK
    ;
    [ PEINT_, DBSEL_, PCIRSEL_, RDY2uP_, PRDYIN_, LERR_, PRDYERR_, PBOFF ].AR =
    !RESET_ ;

[ AVCS_, TINT_, NMI_, LCHD2uP_, EXTBGNT_ ].CLK = CLK   ;
    [ AVCS_, TINT_, NMI_, LCHD2uP_, EXTBGNT_ ].AR  = !RESET_ ;

    [ PRDY2T, EOB1, EOB2, INTCNT, ERRCNT, USRCNT, ADS1, BLAST1, LTBR1, LTBR0 ].CLK =
    CLK   ; "NODES
    [ PRDY2T, EOB1, EOB2, INTCNT, ERRCNT, USRCNT, ADS1, BLAST1, LTBR1, LTBR0 ].AR =
    !RESET_ ;

EXTBGNT_.D  = ( (BCS.FB == uPMST ) # (BCS.FB == uPWAIT ));

    PBGNT       = ( (BCS.FB == PLXMST ) # (BCS.FB == PLXWAIT));

TBM_        = !( (BCS.FB == TACMST ) # (BCS.FB == TACTURN) # (BCS.FB == TACWAIT));

TBG_        = !( (BCS.FB == TACMST ) # (BCS.FB == TACTURN) # (BCS.FB == TACWAIT));
```

```
PRDY2T.D   = ( ( !TBM_ & PCIMEM & !PRDYOUT_ & WRT    ) "LATCH FIRST PLX
READY (DIRECT WRT) -- NOT USED
           #  ( !TBM_ & PCIMEM &  PRDY2T.Q & AVCS_.PIN )); "HOLD

"DRIVEN WHEN TACH. IS THE MASTER
                                          "TACH. ONLY NEEDS 1 CLK LONG RDY
TRDY_      = !((( (BCS.FB == TACWAIT) & !DBSEL_.FB & !WRT       ) "ACC TO DB
           # ( (BCS.FB == TACWAIT) & !DBSEL_.FB & WRT & EOB     ) "DELAY RDY
UNTIL LAST DATA XFER

# ( (BCS.FB == TACWAIT) & PCIMEM   & !WRT  & !PRDYOUT_ ) "DIRECT
MASTER RD
           # ( (BCS.FB == TACWAIT) & PCIMEM   & WRT   & !PRDYOUT_ ) "DIRECT
MASTER WRT
        "  # ( (BCS.FB == TACWAIT) & PAFULL_ & WRT & EOB & PRDY2T.Q )  DIRECT
MASTER WRT - DELAY RDY
           "                                  UNTIL PLX FIFO IS EMPTY

# ( (BCS.FB == TACWAIT) & !LERR_.FB           )); "ILLEGAL ACC
                                          "TACH 2PLXREG = LOCAL ERROR

BLAST1.D   = ((( (BCS.FB == TACWAIT) & PRDYOUT_ & PCIMEM & (TREQ == ^h3) )
"SET
           #  ( BLAST1.Q     & PRDYOUT_          )); "HOLD UNITL PLX IS RDY

"DRIVEN WHEN TACH. IS THE MASTER
BLAST_     = !((( (BCS.FB == TACWAIT) & PCIMEM & (TREQ == ^h3) ) "DIRECT MASTER
ACCESS
           #  ( BLAST1.Q                   ));

PCIRSEL_.D = ((( (BCS.FB == uPMST ) & PLXREG & !EXTBGNT_.FB )
           #  ( (BCS.FB == uPWAIT) & PLXREG & RDY2uP_.FB )
           #  ( (BCS.FB == uPWAIT) & PLXREG & BLAST_.PIN )); "TACH 2 PLXREG =
LOCAL ERROR

DBSEL_.D   = ((( (BCS.FB == uPMST ) & DB1 & !EXTBGNT_.FB    )
           # ( (BCS.FB == uPWAIT) & DB1 & BLAST_.PIN    )
           # ( (BCS.FB == uPWAIT) & DB1 & !BLAST_.PIN & !WRT ) "HOLD DURNING
READS
           # ( (BCS.FB == PLXMST ) & DB1 & !ADS_.PIN    )
           # ( (BCS.FB == PLXWAIT) & DB1 & BLAST_.PIN    )

# ( (BCS.FB == TACMST ) & DB1 & !AVCS_.PIN   )
           # ( (BCS.FB == TACWAIT) & DB1 & !AVCS_.PIN   ) "STREAM
           # ( (BCS.FB == TACTURN) & DB1                )
           # ( (BCS.FB == TACWAIT) & DB1 & !EOB         ));
```

```
                                            "PLX IS THE BUS MASTER
PRDYIN_.D   = ((( BCS.FB == PLXMST ) & DB1     & !ADS_.PIN    )   "ACC. TO DB
            #  ( (BCS.FB == PLXWAIT) & !DBSEL_.FB &  BLAST_.PIN   )

(( BCS.FB == PLXMST ) &  EXPROM   & !ADS_.PIN    )   "ACC. TO EXPROM

#  ( (BCS.FB == PLXWAIT) & TAC1      & !TRDY_.PIN   )   "ACC. TO TACH.
            #  ( (BCS.FB == PLXWAIT) & TAC1      & (ERRCNT.Q == ^h7))  "TACH. ERROR

( (BCS.FB == PLXWAIT) & !LERR_.FB              ));  "ILLEGAL ACC

BTERM_   = 1 ;
PLOCK_   = 1 ;
PBOFF.D  = 0 ;  "PLX WILL RELEASE BUS IF PBOFF = 1, DURING DMA'S.
         "IE. REQUEST BY uP/TACH

"        =  (( PBUSREQ & !TBR1_  )
"        #  ( PBUSREQ & !TBR0_   )
"        #  ( PBUSREQ & !EXTREQ_ ));

"REM: DURING DIRECT MASTER ACCESSES, THE uP OR TACH.
"             IS THE BUS MASTER -- NOT PLX

TRETRY_  = 1 ; "READS ONLY

AVCS_.D  = ((( BCS.FB == uPMST  ) & TAC1 & !EXTBGNT_.FB )  "DRIVEN WHEN TACH.
IS THE TARGET
         #  ( (BCS.FB == PLXMST ) & TAC1 & !ADS_      ));  "PLX 2TACH

ADS1.D   = ((( BCS.FB == uPMST  ) & PLXREG & !EXTBGNT_.FB )
         #  ( (BCS.FB == uPMST  ) & PCIMEM & !EXTBGNT_.FB ));

ADS_     = !(( ADS1.FB    )             "DRIVEN WHEN PLX IS NOT THE BUS MASTER
"        #  ( (BCS.FB == TACWAIT) & !AVCS_.PIN )   STREAMING
         #  ( (BCS.FB == TACMST ) & !AVCS_.PIN )); "TACH 2PLXREG (LOCAL.ERR)

RDY2uP_.D = ((( BCS.FB == uPMST  ) & DB1     & !EXTBGNT_.FB & WRT )  "DELAY
READ RDY 1 CLK
         #  ( (BCS.FB == uPWAIT ) & DB1                    )

( (BCS.FB == uPWAIT ) & PCIACC & !PRDYOUT_     )

#  ( (BCS.FB == uPWAIT ) & TAC1   & !TRDY_.PIN    )
         #  ( (BCS.FB == uPWAIT ) & TAC1   & (ERRCNT.Q == ^h7) )); "TACH. ERROR
```

```
    DPAR2P_   = (( PBGNT   & WRT )
              # ( P_TARGET & !WRT ));

PPAR2D_   = !(( PBGNT   & WRT )
              # ( P_TARGET & !WRT ));

LCHD2uP_.D = ((( (BCS.FB == uPWAIT ) & !WRT & PLXREG & !PRDYOUT_  )  "SET
              # ( (BCS.FB == uPWAIT ) & !WRT & TAC1   & !TRDY_.PIN )  "SET
              # ( (BCS.FB == uPWAIT )            & !LCHD2uP_.FB )  "HOLD
              # ( (BCS.FB == I1     )            & !LCHD2uP_.FB )); "HOLD

PECLK     = (( !TBM_   & !WRT & !TRDY_ & CLK )  "MODEL GIVES 15 ns DELAY, ie. 1 ns
    HOLD, REAL
              # ( T_TARGET &  WRT & !TRDY_ & CLK ));

PEINT_.D  = (( !PE_      )  "SET (D2T.PE) - WILL NOT BE SET IF
              # ( !PEINT_.FB & CLRPE_ ));  "RDY ERROR IS DET. (LAST WORD )

LERR_.D   = (( !TBM_    & !AVCS_.PIN & !TACHOK )  "TACH. ILLEGAL ACCESS
              # ( !TBM_    & !LERR_.FB       )  "HOLD

# ( PBGNT    & !ADS_.PIN & !PLXOK )  "PLX ILLEGAL ACCESS
              # ( PBGNT    & !LERR_.FB        )  "HOLD

# ( !TBM_    & PBUSREQ  & PCIMEM )  "POTENTIAL DEAD LOCK
                                            " ACCESS TO DB
                                            " ACCESS TO PLXREG
                                            "NO WAY TO BACKOFF TACH

# ( !EXTBGNT_.FB & PBUSREQ  & PCIMEM ));  "POTENTIAL DEAD LOCK
                                            " ACCESS TO DB
                                            " ACCESS TO PLXREG
                                            " ACCESS TO TACH
                                            "NO WAY TO BACKOFF uP (BTERM )

EOB1.D    = ( EOB );

EOB2.D    = ( EOB & !EOB1.Q );

PRDYERR_.D = ( PRDYOUT_ & !TBM_ & PCIMEM & !WRT & !EOB1 );  "CHECK FOR
    RDYS WHILE TACH.
                                       "IS READING FROM PCI MEMORY
```

```
INTCNT.D   = (( !TIRQ_    & [0,0,0]         ) "LOAD
           # ( !(INTCNT == ^h7) & !TINT_.FB & (INTCNT.Q +1) )); "COUNT TO 7 AND STOP

TINT_.D    = (( !TIRQ_              )
           # ( !(INTCNT == ^h7) & !TINT_.FB ));

ERRCNT.D   = (( !TAC1 & [0,0,0] )                        "LOAD
           # ( TERR_ & [0,0,0] )                         "LOAD
           # ( (BCS.FB == uPWAIT ) & TAC1 & !TERR_ & !(ERRCNT.Q == ^h7) & (ERRCNT.Q +1) ) "COUNT
           # ( (BCS.FB == PLXWAIT) & TAC1 & !TERR_ & !(ERRCNT.Q == ^h7) & (ERRCNT.Q +1) ) "COUNT
           # (                      TAC1 & !TERR_ &  (ERRCNT.Q == ^h7) & (ERRCNT.Q   ) )); "HOLD

USRCNT.D   = (( !USERO_   & [0,0,0]         ) "LOAD
           # ( !(USRCNT == ^h7) & !NMI_.FB & (USRCNT.Q +1) )); "COUNT TO 7 AND STOP

NMI_.D     = (( !SERR_              )
           # ( !USERO_              )
           # ( !(USRCNT == ^h7) & !NMI_.FB ));

LREQ.D     = (( TREQ  & !AVCS_.PIN )
           # ( LREQ.Q &  AVCS_.PIN ));

"TESTPT    = PEINT_.FB & TERR_ & ( TIRQ_ & TINT_ ) ;  PRDYERR_.FB & LERR_.FB ARE PART OF INT0

TESTPT     = PEINT_.FB & TERR_              ; "PRDYERR_.FB & LERR_.FB ARE PART OF INT0
```

```
STATE_DIAGRAM  BCS   "LOCAL BUS CONTROL STATE MACHINE

STATE IDLE:   "STATE 0 -- IDLE

CASE
   ( uPBREQ                ): uPMST ;
   ( !uPBREQ &  PBREQ      ): PLXMST ;
   ( !uPBREQ & !PBREQ &  TBREQ ): TACMST ;
   ( !uPBREQ & !PBREQ & !TBREQ ): IDLE   ;

ENDCASE;

STATE uPMST:  "STATE C -- uP IS THE BUS MASTER

CASE
   ( !EXTBGNT_.FB ): uPWAIT ; "
   (  EXTBGNT_.FB ): uPMST  ; "

ENDCASE;

STATE uPWAIT: "STATE D -- uP IS THE BUS MASTER

CASE
   (  BLAST_.PIN #  RDY2uP_.FB ): uPWAIT ; "WAIT FOR PLX/TACH. RDY
   ( !BLAST_.PIN & !RDY2uP_.FB ): I1     ; "uP DMA'S ARE MULTI-BURSTS, NOT ONE
OWNERSHIP

ENDCASE;

STATE I1:     "STATE E -- IDLE 1 - WHERE TO NEXT ?

CASE
   (         PBREQ    ): PLXMST ;
   (        !PBREQ &  TBREQ ): TACMST ;
   (  uPBREQ & !PBREQ & !TBREQ ): uPMST ;
   ( !uPBREQ & !PBREQ & !TBREQ ): IDLE  ;

ENDCASE;
```

```
      STATE PLXMST:  "STATE 4 -- PLX IS THE BUS MASTER

CASE
        ( ADS_.PIN          ): PLXMST ;
        ( !ADS_.PIN         ): PLXWAIT;

ENDCASE;

        STATE PLXWAIT: "STATE 5 -- PLX IS THE BUS MASTER

CASE
        ( PBREQ             ): PLXWAIT; "WAIT FOR PLX TO GIVE UP THE BUS
        ( !PBREQ            ): I2    ; "PLX DMA'S CAN BE ONE OWNERSHIP, MULTI-BURSTS
        ENDCASE;

STATE I2:     "STATE 6 -- IDLE 2 - WHERE TO NEXT ?

        CASE
        (              TBREQ ): TACMST ;
        ( uPBREQ         & !TBREQ ): uPMST  ;
        ( !uPBREQ &  PBREQ & !TBREQ ): PLXMST ;
        ( !uPBREQ & !PBREQ & !TBREQ ): IDLE   ;
25
        ENDCASE;
```

25

```
STATE TACMST:  "STATE 8 -- TACHYON IS THE BUS MASTER

CASE
    ( AVCS_.PIN       ): TACMST ;
    ( !AVCS_.PIN &  WRT ): TACWAIT;
    ( !AVCS_.PIN &  !WRT ): TACTURN;

ENDCASE;

STATE TACWAIT:  "STATE 9 -- TACHYON IS THE BUS MASTER

CASE
    ( !EOB &  AVCS_.PIN              ): TACWAIT;

( EOB &  !AVCS_.PIN &  !WRT      ): TACTURN;  "CONT. READ  STREAMING - DIR MST
    ( EOB &  !AVCS_.PIN &  WRT       ): TACWAIT;  "CONT. WRITE STREAMING - DIR MST ( EOB &  AVCS_.PIN &  (TREQ == LREQ)       ): TACWAIT;  "WAIT FOR TACH TO GIVE-uP THE BUS
    ( EOB &  AVCS_.PIN &  !(TREQ == LREQ) &  !TERR_ ): TACWAIT;  "IGNORE REQ CHANGE, IF T.ERROR/ IS TRUE ( EOB &  AVCS_.PIN &  !(TREQ == LREQ) &  TERR_ ): I3   ;

ENDCASE;

STATE TACTURN:  "STATE A -- TACHYON IS THE BUS MASTER

GOTO TACWAIT;

STATE I3:      "STATE B -- IDLE 3 - WHERE TO NEXT ?

CASE
    ( uPBREQ              ): uPMST ;
    ( !uPBREQ &  PBREQ        ): PLXMST ;
    ( !uPBREQ &  !PBREQ &  TBREQ ): TACMST ;
    ( !uPBREQ &  !PBREQ &  !TBREQ ): IDLE  ;

ENDCASE;
```

APPENDIX B

"MACROS

   LOAD  MACRO {( !TBM_ & !AVCS_     )};
   RDRDY  MACRO {( !TBM_ & !LT2 & !TRDY_ )}; "TACH. READS - WAIT FOR 1ST RDY

   EQUATIONS
   "
   "ENABLE OUTPUTS IF 'TS/' IS HI:
   "
   XLEN.OE    = TS_ ; "3
   [ ADD2T_, DATA2T_, T2ADD, T2DATA_, HLDADD_,
     LD  , ENPE , EOB , CNTEN      ].OE = TS_ ;

"ENABLE OUTPUTS IF 'TS/' IS HI AND TACH. IS THE TARGET (1 CLK)
   AOE       = TS_ & TBM_ & !AVCS_ ;
   A.OE      = AOE ; "5         DEFAULT FEEDBACK = .PIN
   TYPE.OE   = AOE ; "3

   "ENABLE OUTPUTS IF 'TS/' IS HI AND TACH. IS THE MASTER

BOE      = TS_ & !TBM_ ;
   B42.OE   = BOE ; "3          DEFAULT FEEDBACK = .PIN
   BEN.OE   = BOE ; "4
   WRT.OE   = BOE ; "

"CLOCK AND RESET
   [ B42, CNTEN, XLEN, EOB, T2ADD ].CLK = CLK  ;
   [ B42, CNTEN, XLEN, EOB, T2ADD ].AR  = !RESET_ ;

[ LTIN, TURN, ENPE1, EOB1, EOB2, D2T1, D2T2, T2D1, T2D2, HLDADD ].CLK = CLK  ;
   "NODES
   [ LTIN, TURN, ENPE1, EOB1, EOB2, D2T1, D2T2, T2D1, T2D2, HLDADD ].AR  = !RESET_ ;

LTIN.D   = (( TYPE & !AVCS_    ) "SET
            # ( LTIN.Q & AVCS_ & !TBM_ ) "HOLD
            # (          TBM_ )); "RESET TO HI

TURN.D   = (( TBM_ & !AVCS_ & !WRT ) "READ FROM TACH
            # ( !TBM_ & !AVCS_ & !T2 )); "TACH. READS

WRT    = (( T2 & !AVCS_ )   "DRIVEN WHEN TACH. IS THE MASTER
55       # ( LT2 & AVCS_ ));

27

```
        BEN3    = 0 ;           "DRIVEN WHEN TACH. IS THE MASTER
        BEN2    = 0 ;
        BEN1    = 0 ;
        BEN0    = 0 ;

A4      = B4 ;          "DRIVEN WHEN TACH. IS THE TARGET
        A3      = B3 ;
        A2      = B2 ;
        A1      = !(BEN == 0);
        A0      = !(BEN == 0);

T2      = WRT ;         "DRIVEN WHEN TACH. IS THE TARGET
        T1      = !(BEN == 0);
        T0      = !(BEN == 0);

ADD2T_  = !( TBM_ & !AVCS_ );   "ONE CLK ONLY

     D2T1.D  = (( !TBM_ & !AVCS_  & !T2      )  "TACH. READS
                # ( !TBM_ &  TURN.Q               )
                # ( !TBM_ & !WRT.COM & D2T1.Q & !EOB.FB )  "HOLD
                # ( !TBM_ & !WRT.COM & D2T1.Q & !EOB1.Q )); "HOLD

        D2T2.D  = (( TBM_ &  WRT  & !AVCS_       )  "WRITE TO TACH.
                # ( TBM_ &  WRT  & D2T2.Q & TRDY_ )); "HOLD UNTIL TACH. IS RDY

     DATA2T_ = !( D2T1.Q # D2T2.Q );

T2ADD.D =   !TBM_ ;

        T2D1.D  = (( !TBM_ & T2    & !AVCS_      )  "TACH. WRITES
                # ( !TBM_ & WRT.COM & T2D1.Q & !EOB.FB )); "HOLD

     T2D2.D  = (( TBM_ & !WRT   & !AVCS_      )  "READ FROM TACH.
                # ( TBM_ & !WRT   & T2D2.Q & TRDY_ )); "HOLD UNTIL TACH. IS RDY

T2DATA_ = !( T2D1.Q # T2D2.Q );

HLDADD.D = (( !TBM_ & !AVCS_ )
                 # ( !TBM_ &  AVCS_ & !EOB2.Q & HLDADD.Q ));

HLDADD_ = !(( !TBM_ & !AVCS_ )
                 # ( HLDADD.Q      ));

```

```
        ENPE1.D    = ( !DATA2T_ );

"74833 ASYNC CLR/
        ENPE       = ( !DATA2T_    "TACH. READS or WRITES TO TACH.
           #    ENPE1.Q ); "HOLD/DON'T CLR FOR 1 CLK (PE -> LATCH)

LD         = ( LOAD );

        CNTEN.D    = (( LOAD        & T2 & !(!T1 & !T0) )    "SET FOR TACH. WRITES >1
               #  ( RDRDY   & !EOB.FB    & !(!LT1 & !LT0) )  "SET FOR TACH. READS >1,
        WHEN 1ST RDY IS RECEIVED
               #  ( CNTEN.FB & !EOB.FB            )); "HOLD
                                                       "DRIVEN WHEN TACH. IS THE
        MASTER
        B42.D      = (( LOAD                      & A42.PIN )   "LOAD

          #  ( !LOAD & !LT2 & !RDRDY         & !CNTEN.FB & !EOB.FB & (B42.FB  ))
        "HOLD
           #  ( !LOAD & !LT2 &  RDRDY & !(!LT1 & !LT0) & !CNTEN.FB & !EOB.FB & (B42.FB
        +1))  "COUNT - 1ST READ
           #  ( !LOAD & !LT2              &  CNTEN.FB & !EOB.FB & (B42.FB +1))
        "COUNT

#  ( !LOAD &  LT2               & !CNTEN.FB & !EOB.FB & (B42.FB  ))  "HOLD
           #  ( !LOAD &  LT2               &  CNTEN.FB & !EOB.FB & (B42.FB +1)));
        "COUNT

XLEN.D     = (( LOAD & !T1 & !T0  & LEN1 )                "LD - 1 WORD
        XFER
           #  ( LOAD & !T1 &  T0  & LEN2 )                        "LD - 2 WORD
        XFER
           #  ( LOAD &  T1 & !T0  & LEN4 )                        "LD - 4 WORD
        XFER
           #  ( LOAD &  T1 &  T0  & LEN8 )                        "LD - 8 WORD XFER

          #  ( !LOAD & !LT2 & !RDRDY         & !CNTEN.FB & !EOB.FB & (XLEN.FB  ))
        "HOLD
           #  ( !LOAD & !LT2 &  RDRDY & !(!LT1 & !LT0) & !CNTEN.FB & !EOB.FB &
        (XLEN.FB -1))  "COUNT - 1ST READ
           #  ( !LOAD & !LT2              &  CNTEN.FB & !EOB.FB & (XLEN.FB -1))
        "COUNT

#  ( !LOAD &  LT2               & !CNTEN.FB & !EOB.FB & (XLEN.FB  ))  "HOLD
           #  ( !LOAD &  LT2               &  CNTEN.FB & !EOB.FB & (XLEN.FB -1)));
        "COUNT

EOB.D      = !(( TBM_                      )
           #  ( LOAD &  T2 & !T1  & !T0            )  "LD - 1 WORD XFER
           #  ( !TBM_ & AVCS_ & (XLEN.FB == 0) & !LT2 & (!LT1 & !LT0) & !TRDY_ )
```

```
        # ( !TBM_ &  AVCS_ & (XLEN.FB == 1) & !LT2 &  (!LT1 &  LT0) & RDRDY )
        # ( !TBM_ &  AVCS_ & (XLEN.FB == 1) & !LT2 &  ( LT1 & !LT0)          )
        # ( !TBM_ &  AVCS_ & (XLEN.FB == 1) & !LT2 &  ( LT1 &  LT0)          )
        # ( !TBM_ &  AVCS_ & (XLEN.FB == 1) &  LT2                           )
        # ( !TBM_ &  AVCS_ & (XLEN.FB == 0)                         ));  "HOLD UNTIL TACH.
     GIVES UP THE BUS

     EOB1.D    = ( EOB.FB );

EOB2.D    = ( EOB.FB & !EOB1.Q );
```

What is claimed is:

1. An apparatus for adapting transmissions between an industry standard data bus of a host computer having a host memory and a fibre channel coupled between said host computer and a peripheral storage subsystem having at least one disk drive, said apparatus comprising:
   a. an interface logic having a first input/output terminal coupled to said industry standard bus and a second input/output terminal coupled to a local bus of said apparatus, said interface logic comprising a first set of registers disposed for receiving requests from said host and a second set of registers disposed for receiving instructions from said microprocessor;
   b. a buffer memory having input/output terminals coupled to said local bus;
   c. a multiplexor/control device having a first set of input/output terminals coupled to said local bus and a second set of input/output terminals disposed for transmitting therethrough address and data, said multiplexor/control comprising bi-directional registers and buffers disposed for merging address and data on said local bus before transmission to said fibre channel controller during a write to disk operation, and for separating address and data received from said gigalink module during a read from disk operation;
   d. a fibre channel controller disposed for formatting header and data structures that meet fibre channel protocol, having a first input/output terminal coupled to said second set of input/output terminals of said multiplexor/control device and a second input/output terminal;
   e. a gigabit link module disposed for converting said header and data structures from a parallel format to a serial format and having a first input/output terminal coupled to said second input/output terminal of said fibre channel controller and a second input/output terminal coupled to said fibre channel;
   f. a microprocessor disposed for providing service requests from said host to read and write data from said host memory to and from said peripheral storage subsystem via said buffer memory, said microprocessor having address and data input/output terminals coupled to a processor bus; and,
   g. a bus control device coupled between said processor bus and said local bus for providing service requests of said interface logic, said fibre channel controller and said microprocessor and to arbitrate control of said local bus.

2. An apparatus as in claim 1 wherein said fibre channel controller implements a protocol for organizing data frames for transmitting and receiving data.

3. An apparatus as in claim 1 wherein a non-volatile memory is coupled to said processor bus for providing a permanent storage of a microcode for operation of said microprocessor.

4. An apparatus as in claim 1 wherein a volatile random-access memory is coupled to said processor bus for providing memory for said microprocessor.

5. In a file server having a peripheral storage subsystem coupled thereto, a method for adapting fibre channel transmissions between said file server and said storage subsystem to an industry standard data bus of said file server, said method comprising the steps of:
   a. receiving a command control block from said file server, said block containing information as to type of command and information as to location in a memory of said file server of data to be transferred;
   b. determining type of said command, and if a write command;
   c. storing said data in a buffer memory;
   d. moving said data from said buffer memory, through a fibre channel controller and to a gigabit link module;
   e. converting in said gigabit link module said data from a parallel format to a serial format for transmission over a fibre channel; and,
   f. formatting in said fibre channel controller said data into header and data structures that meet fibre channel protocol.

6. The method as in claim 5 wherein said command is a read command further including the steps of:
   a. receiving from said storage subsystem via said fibre channel read data;
   b. converting in said gigabit link module said read data from a serial format to a parallel format for receipt and transmission to said server;
   c. moving said read data from said gigabit link module through said fibre channel controller to said buffer memory; and,
   d. transferring said read data from said buffer memory to said memory in said file server.

7. The method as in claim 6 further including the step of de-formatting said read data from header and data structures into address and data.

8. The method as in claim 7 further including the step of multiplexing said de-formatted read data onto an address and data bus, resspectively.

9. In a file server having a peripheral storage subsystem coupled thereto, a method for adapting fibre channel transmissions between said file server and said storage subsystem to an industry standard data bus of said file server, said method comprising the steps of:
   a. receiving a command control block from said file server, said block containing information as to type of command and information as to location in a memory of said file server of data to be transferred;
   b. determining type of said command, and if a write command;
   c. storing said data in a buffer memory;
   d. moving said data from said buffer memory, through a fibre channel controller and to a gigabit link module;
   e. converting in said gigabit link module said data from a parallel format to a serial format for transmission over a fibre channel;
   f. if said command is a read command, receiving from said storage subsystem via said fibre channel read data;
   g. converting in said gigabit link module said read data from a serial format to a parallel format for receipt and transmission to said server;
   h. moving said read data from said gigabit link module through said fibre channel controller to said buffer memory;
   i. transferring said read data from said buffer memory to said memory in said file server; and,
   j. formatting in said fibre channel controller said data into header and data structures that meet fibre channel protocol.

10. The method as in claim 9 further including the step of de-formatting said read data from header and data structures into address and data.

11. The method as in claim 9 further including the step of multiplexing said de-formatted read data onto an address and data bus, respectively.

* * * * *